United States Patent [19]

London et al.

[11] Patent Number: 5,618,571
[45] Date of Patent: Apr. 8, 1997

[54] FOOD MOLDING APPARATUS AND METHOD OF FORMING FOOD PRODUCTS

[75] Inventors: Eugene J. London, Sandusky, Ohio; Winje Green, Hjarnarp, Sweden; Gary Dare, Colorado Springs, Colo.

[73] Assignee: Stein, Inc., Sandusky, Ohio

[21] Appl. No.: 500,305

[22] Filed: Jul. 10, 1995

[51] Int. Cl.⁶ ................................. A22C 7/00; A23P 1/00
[52] U.S. Cl. ..................... 426/512; 425/405.1; 425/556; 425/575; 426/513
[58] Field of Search ........................ 426/512, 513; 425/227, 357, 405.1, 556, 572, 575, 238

[56] References Cited

U.S. PATENT DOCUMENTS

| | | | |
|---|---|---|---|
| 2,820,247 | 1/1958 | Michaud | 425/382 R |
| 2,852,809 | 9/1958 | Miles et al. | 425/227 |
| 3,535,735 | 10/1970 | Egee | 425/382 R |
| 4,118,169 | 10/1978 | Haluska | 425/583 |
| 4,272,864 | 6/1981 | Holly | 426/513 |
| 4,276,318 | 6/1981 | Orlowski et al. | 426/513 |
| 4,516,291 | 5/1985 | Goldberger et al. | 426/513 |
| 4,975,039 | 12/1990 | Dare et al. | 425/238 |
| 5,145,690 | 9/1992 | Riubrugent | 426/513 |

*Primary Examiner*—George Yeung
*Attorney, Agent, or Firm*—Oldham & Oldham Co., LPA

[57] ABSTRACT

The invention provides a molding apparatus and process of molding formable materials which comprises at least one supply manifold for receiving a formable material and plungers or pistons for applying pressure to the formable material within the manifolds. A mold plate including at least one mold cavity is driven between fill and discharge positions, with the at least one mold cavity selectively exposed to the supply manifold when in the fill position. A clamp member is positioned adjacent the mold plate when in the fill position, and pressure is applied on the clamp member to clamp the mold plate against the supply manifold. The clamp member and associated structure apply pressure to the clamp member compensating for deflection of these structural members which maintains the mold plate in firm clamping relation relative to the supply manifold. The clamp plate therefore does not operate in flexure, and eliminates the need to provide the clamp plate with a thick cross section or heavy mass which would accommodate forces normally encountered during filling of the mold cavities. In this manner a mold plate having a relatively thin section, and a clamp member also of relatively thin section may be utilized, to allow a machine having significantly increased width to be realized. The significantly increased width of the machine will correspondingly increase capacity, and also allows compatibility with other processing equipment.

28 Claims, 9 Drawing Sheets

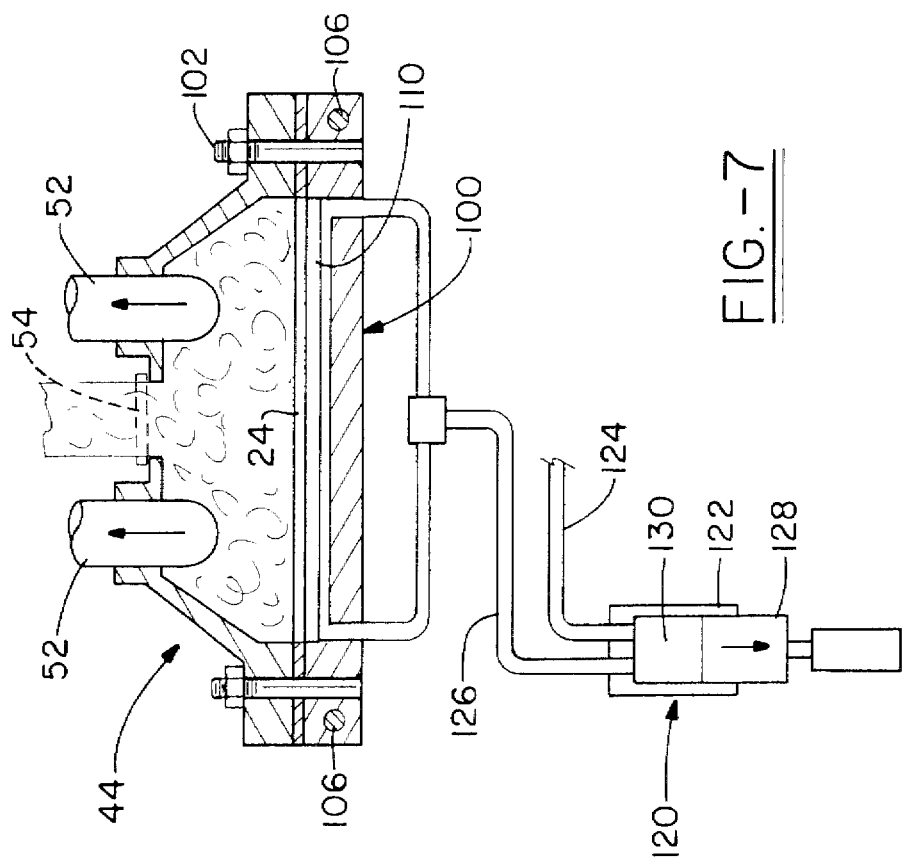
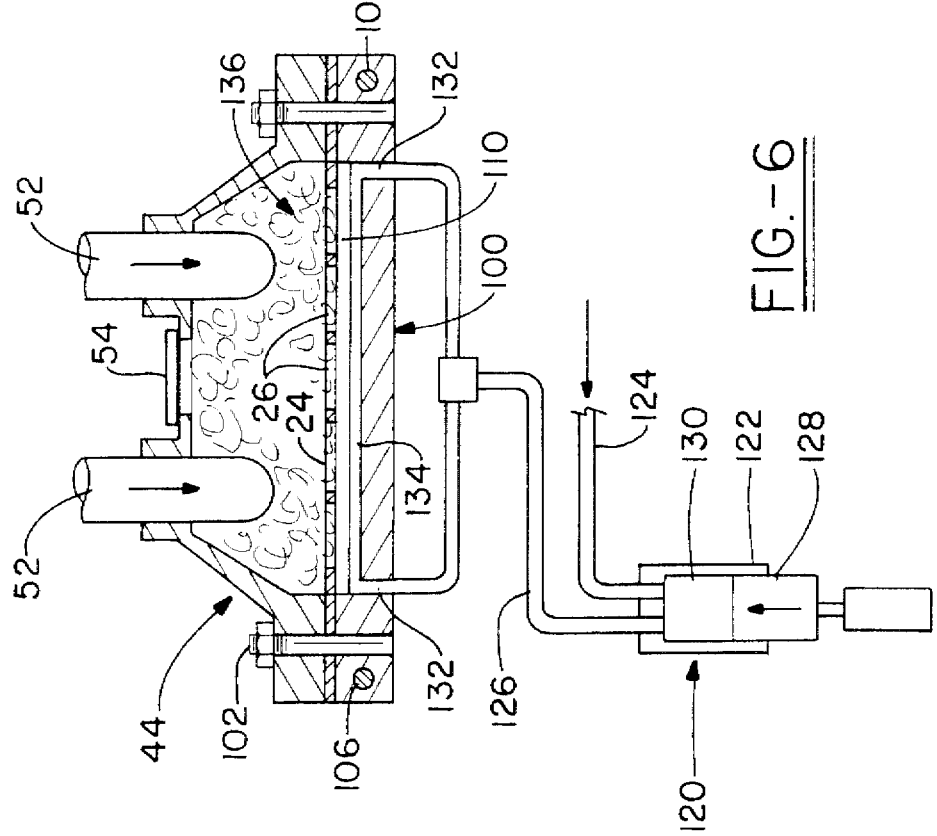

FOOD MOLDING APPARATUS AND METHOD OF FORMING FOOD PRODUCTS

BACKGROUND OF THE INVENTION

This invention generally relates to an apparatus for molding formable materials and its method of operation. More particularly, the invention relates to a food molding apparatus and method of forming food products wherein precise portions of a formable material are produced in a desired shape, with the machine allowing increased capacity by enabling the width of the machine to be increased significantly.

In the area of large scale food processing, forming food products of formable materials such as ground beef, whole muscle chicken products, dough or other food mixtures, is critical to further processing procedures, such as cooking or frying of large volumes of food products. Fast food chains are well-known for the use of these types of products, which are also utilized by restaurants and individual consumers. In the automated production of molded and portioned food products, high-speed machinery is used to form a patty or similar product. Particular problems in such machinery have been found in attempting to increase production efficiency while providing uniform product shapes and weights.

In known food forming machines, a food supply hopper is charged with an amount of ground beef or the like, which is forced under high pressure through one or more discharge openings or slots formed in the supply hopper. A mold plate having mold cavities corresponding to the discharge openings in the supply hopper is moved between a fill position where the formable food product is forced into the cavities under pressure, and a knock-out position where the contents of the cavity are removed or knocked out. This cycle is repeated as quickly as possible to increase capacity of the machine. In many such machines, an end feed conveyor system is positioned relative to the knock-out position of the mold plate to receive the molded food products and transport them for further processing.

Substantial limitations in the known molding machines have been found, based upon the structural integrity of the mold plate and supply hopper, which are critical due to the high pressures used to fill the mold cavities in the mold plate. Deflection of the mold plate, the support structure for the mold plate and/or the supply hopper can create leakage of the formable material, causing significant problems in producing uniform formed products of precise weight and shape. Such leakage of the formable material also results in significant operational problems in use of the machine. Preventing deflection of the members has required heavy-duty construction, and has limited the widths of these members in the machine. In addition, the thicknesses of the members is limited due to limitations regarding how far a product be dropped from the cavity of the mold plate onto a conveyor for example. It should also be recognized that a conveyor system would have to be spaced from the machine a distance to accommodate any food product to be carried thereby, limiting the total thickness of the reacting support plate and therefore imposing limitations on the width to prevent deflection of these members. Known high-speed molding machines are therefore limited to a twenty-six inch conveyor belt width, corresponding to the width of the mold plate and supporting structure. These same aspects therefore limit the number of cavities which can be formed in the mold plate across its width, and therefore limit the capacity of such machines.

Another significant problem in conventional food forming apparatus is found in that the pressure applied to the food product to fill the mold cavities of the mold plate is normally applied while the mold plate is moving from the fill to knock-out positions. To increase speed of operation, continuous movement of the mold plate or only short duration stoppage for ejecting product from the mold cavities is common. Movement of the mold plate under filling pressure causes leakage of the food product. Additionally, pressure used during filling of the mold cavities continues to be applied even after movement of the mold plate withdraws the cavities from exposure to the food material, causing food product to be forced back against the pressurizing force being applied, further damaging the material. With food products such as whole muscle chicken products or the like, these forces on the meat product within the supply hopper and relative to the mold plate cause significant degradation of the food product, particularly with chicken products where the whole muscle quality of the meat should be maintained.

In addition to the limitations described above, known forming machines generally do not have the ability to utilize a flow-through type of conveyor system, limiting their use with respect to other processing equipment, as well as limiting their use as a forming machine. It would therefore be desirable to provide a forming machine to overcome these limitations to increase capacity of the machine, while handling the formable material gently so as to maintain the integrity of the material.

SUMMARY OF THE INVENTION

The molding apparatus and method of molding formable materials in accordance with the invention overcomes the deficiencies of the prior art, having as an objective to significantly increase output capacity of the machine for high volume food processing.

A further object of the invention is to provide a food molding apparatus and method of forming food products which significantly reduces damage to the formable material during molding.

Another object of the invention is to provide a molding apparatus which allows the width of the mold plate and correspondingly of a conveyor system to be significantly increased thereby increasing capacity, and to allow compatibility with other processing equipment.

These and other objects of the invention are achieved by means of a molding apparatus for processing formable materials which comprises a supply manifold for receiving a formable material and means for applying pressure to the formable material within the manifold. A mold plate having opposed first and second surfaces and including at least one mold cavity is provided, and a mold plate drive moves the mold plate between fill and discharge positions. The first surface of the mold plate is disposed adjacent to the manifold when in the fill position, such that the at least one cavity is selectively exposed to the formable material in the manifold for filling. A clamp member is positioned adjacent the second surface of the mold plate when in the fill position, and means are provided to apply pressure on the clamp member over the second surface to clamp the mold plate against the supply manifold. A pumping mechanism is used to selectively apply pressure on the formable material in the manifold to gently fill the at least one mold cavity. A knock-out mechanism selectively removes the product from the filled mold cavity of the mold plate when in the discharge position.

The invention also provides a method of forming molded food products including the steps of supplying a formable material into a supply manifold of a molding apparatus. A mold plate having at least one mold cavity is selectively positioned so the at least one mold cavity is selectively exposed to the formable material within the supply manifold. A clamp member is positioned adjacent the mold plate, and pressure is applied on the clamp member to substantially prevent deflection of the mold plate from a clamped position relative to the supply manifold. Pressure is then applied to the formable material within the supply manifold to urge the material into the at least one mold cavity while the mold plate is in the fill position. Subsequent to filling of the at least one mold cavity, pressure on the clamp member is released, and the mold plate is selectively moved to a discharge position for removal of the formable material from the at least one cavity.

BRIEF DESCRIPTION OF THE DRAWINGS

The objects and advantages of the invention will be more clearly understood by reading the following detailed description of the preferred embodiment, in conjunction with the drawings, wherein:

FIG. 6 is a view of the fill cycle of the molding apparatus, showing schematically a cross-section along line A—A of FIG. 2;

FIG. 7 is a diagram of the molding apparatus during product recharge and knock-out cycles in operation of the apparatus, schematically showing a cross-section taken along line A—A of FIG. 2;

DETAILED DESCRIPTION OF THE INVENTION

Figure 1:
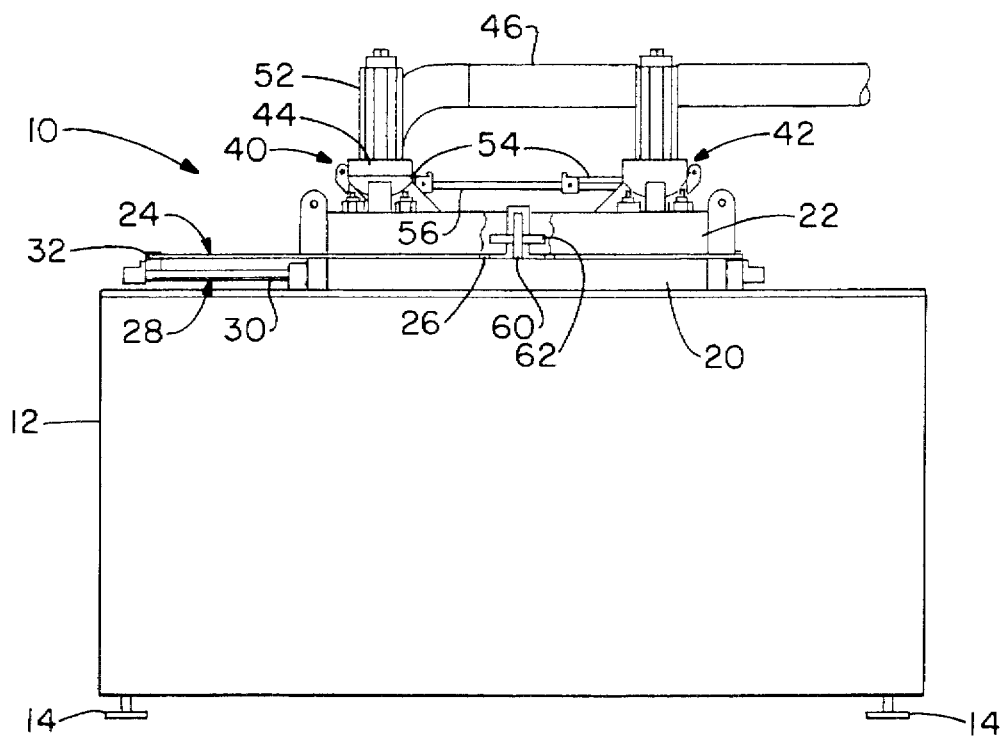
FIG. 1 is a front elevational view of the molding apparatus in a first preferred embodiment of the invention.
Figure 2:
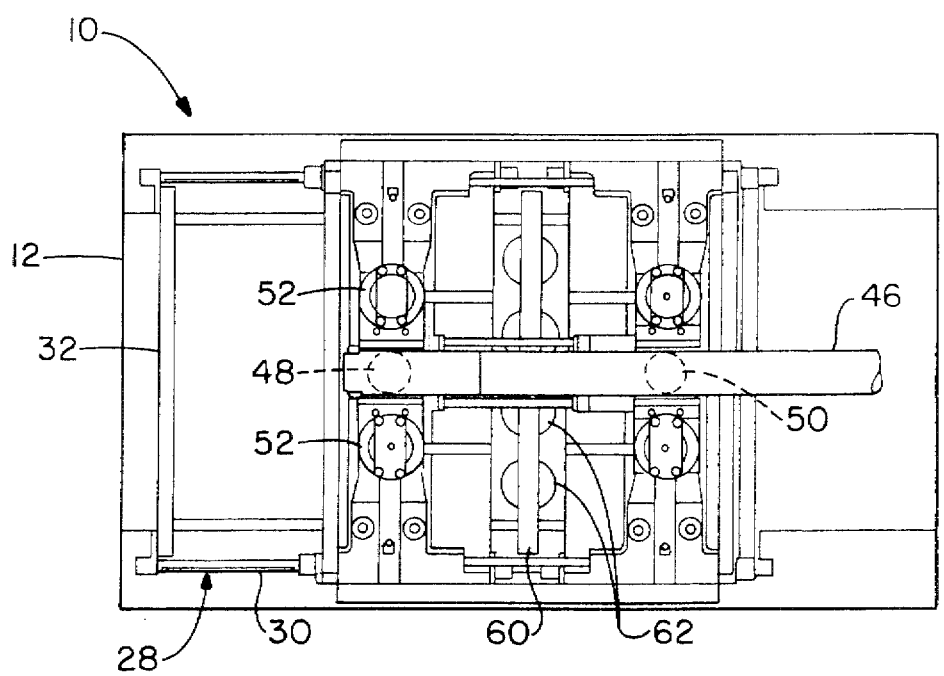
FIG. 2 is a top view of the molding apparatus of FIG. 1.
Figure 3:
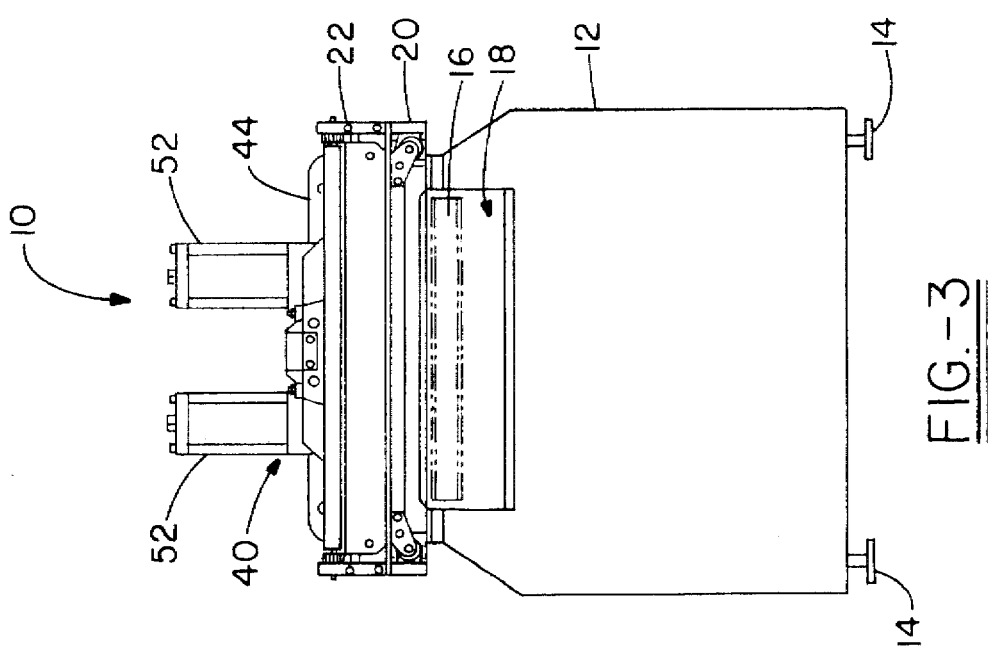
FIG. 3 is an end elevational view of the molding apparatus as shown in FIG. 1.

The molding apparatus of the present invention and the method of forming moldable materials of the invention will be described with reference to a preferred embodiment thereof, with it being generally recognized that the invention is not to be limited to this preferred embodiment. Turning to FIGS. 1–3, the molding apparatus 10 generally includes a housing 12 which may be mounted on floor supports 14 for positioning of apparatus 10 on any suitable surface. Alternatively, a plurality of casters or the like may be mounted on the housing 12 for simplifying portability of apparatus 10. The molding machine 10 can be used for producing precise food portions of a formable food product in any desired shape, with the portions being of uniform size and weight. The apparatus 10 may be used for producing hamburger or chicken patties, bread dough, meat pies, or a variety of other food products, as well as for molding other formable materials. As seen in FIG. 3, a conveyor belt 16 may extend through an access port 18 formed in housing 12, on either one or both sides of the apparatus 10. The conveyor 16 may therefore be of a flow-through type, such as endless conveyor system which extends from one side of housing 12 to the other, having entrance and exit ports 18. The flow-through type of conveyor belt 16 allows machine 10 to be used in line with other processing equipment preceding or following it, to allow a great amount of flexibility in its use. For example, a subsequent step in a food processing operation may include breading, cooking, frying, packaging, or freezing the formed food products immediately after processing in the molding machine 10. Additionally, the flow-through type of conveyor 16 would also allow flexibility in the type of food product formed, with the ability to utilize the molding apparatus to deposit one type of food product onto another type of food product or in another depositing operation. As an alternative to a flow-through conveyor 16, and end feed conveyor may be utilized, wherein the conveyor system simply removes formed products from the machine 10 during processing.

Above the conveyor system 16, a first platen 20 is mounted upon a support structure which will be described in more detail hereinafter. A second platen 22 is disposed directly above the first platen 20, again mounted on the support structure so as to be aligned with the first platen 20. Associated with first platen 20 is a mold plate 24, positioned at the upper portion of platen 20. The mold plate 24 is formed with at least one mold cavity, and preferably a plurality of mold cavities in one or more sets. The mold plate 24 is reciprocally driven by mold plate drive means 28. The drive means 28 may be of any suitable type. In the preferred embodiment, the mold plate drive is hydraulically driven by means of a hydraulic cylinder formed in platen 20 in association with rod 30, which forms part of the hydraulic cylinder. The rod 30 is securely fastened to mold plate 24 by coupling means 32 at an edge thereof. In the preferred embodiment, the mold plate 24 is reciprocally moved at high speed between predetermined positions for performing fill and knock-out operations with respect to the mold cavities 26. Means may be provided in association with the mold plate 24 to maintain product in the mold cavities formed in the mold plate and within the fill heads 40 and 42 to be hereinafter described, during reciprocal movement of the mold plate. Such means may comprise a mold plate knife (not shown) which also moves reciprocally relative to the mold plate and fill heads 40 and 42. Such a mold plate knife may be used to selectively shear the formable material at a position above the mold plate knife after filling of the mold cavities, to maintain the formable material within the mold cavities as well as in the fill heads 40 and 42.

Associated with the upper platen 22 are first and second fill heads 40 and 42, which allow the capacity of machine 10 to be doubled. Each of the fill heads 40 and 42 may be constructed similarly, and each comprises a supply manifold 44 for receiving a formable material from an input feed 46. The input feed 46 may be a feed tube, having outlet openings 48 and 50 to supply the formable material to the supply manifold 44 of each of the fill heads 40 and 42. Formable material may be supplied through tube 46 under pressure by any suitable means, such as an auger feed system or other pumping mechanism such as a piston or vane pump. Associated with each of the supply manifolds 44 are one or more product plungers 52, providing means for selectively applying pressure on the formable material in the supply manifold 44. In a preferred embodiment, the plungers 52 may be hydraulically actuated cylinders which are selectively moved into the supply manifold 44 to exert pressure on the material therein. It is desired that the plungers 52 exert a substantially uniform force onto the formable material within the manifold 44 at the position of the mold cavities which will be exposed to the formable material during a filling operation. Also in the preferred embodiment, the plurality of plungers 52 used in association with the manifold 44 are each driven separately by suitable drive means, to allow self-adjustment based upon characteristics of the formable material within the supply hopper 44. For example, each of the plungers 52 may be driven by an independent hydraulic cylinder to allow the plungers to adjust for possible variations in the formable materials, such as cold spots or similar variations in the food products supplied to manifold 44. It should be recognized that the manifolds 44 may be of any desired shape or dimension, and the number of plungers 52 used in association therewith may vary accordingly.

At the location of the product infeed to each of the fill heads 40 and 42, a feed gate 54 is provided to be selectively positioned to stop the flow of the formable material into the supply manifold 44, and to seal the formable material within the manifold. In the preferred embodiment, each of the gates 54 is mounted on a single rod 56 which is moved reciprocally by suitable drive means to individually close each of the supply manifolds 44 in a cyclic operation. In the preferred embodiment, the rod 56 is hydraulically driven, with hydraulic cylinders formed directly in the casting of the manifold 44. Hydraulic fluid is applied to one side of rod 56 or the other to move it reciprocally relative to fill heads 40 and 42. As both gates 54 are on the same rod 56, movement of the rod 56 to open one gate 54 will correspondingly close the other gate 54 of the other manifold 44.

The apparatus 10 also includes a knock-out plunger 60 movably mounted in platen 22 for ejecting the individual portions of the formable material from the mold cavities 26 during operation of the apparatus 10. The knock-out plunger 60 may therefore include a plurality of knock-out cups 62 having a diameter slightly less than the inside diameter of the mold cavities for injection of the molded material from the cavities 26.

Figure 4:
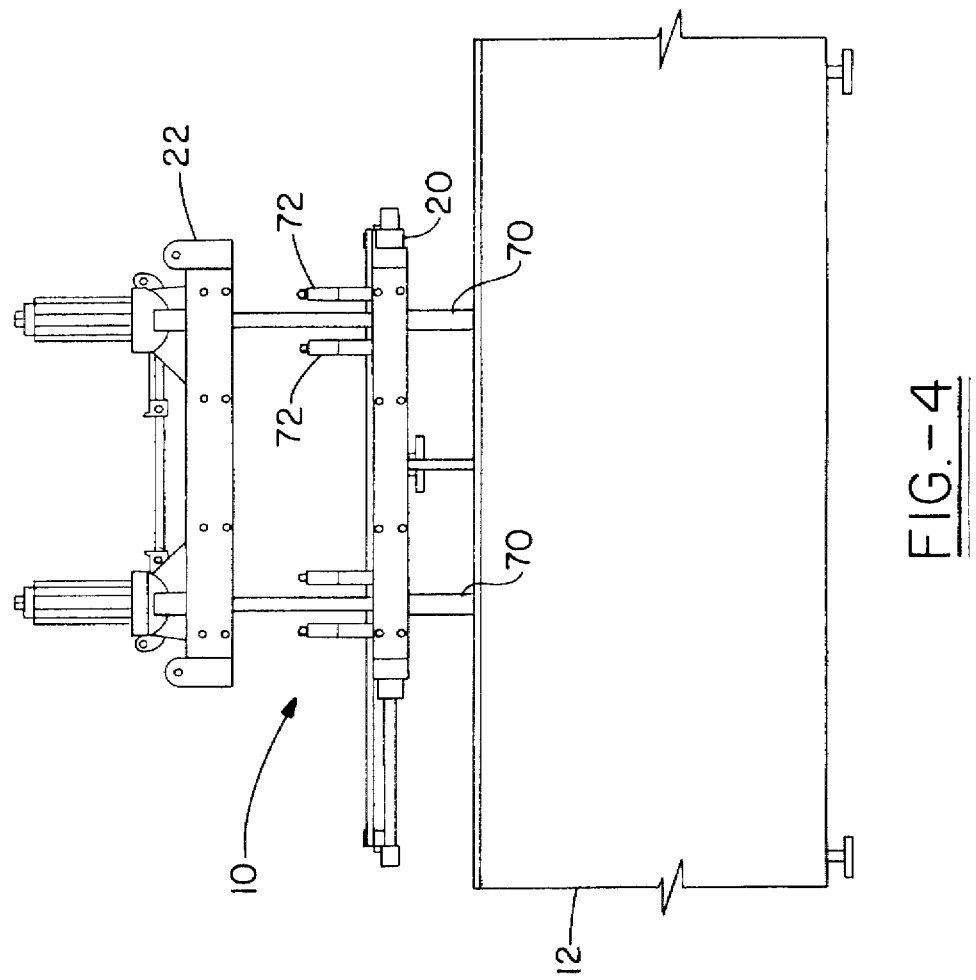
FIG. 4 is a side elevational view of the molding apparatus of the embodiment of FIG. 1, shown in a position for cleaning of the machine.

As shown in FIG. 4, both the lower platen 20 and upper plate 22 are mounted upon a support structure comprising a plurality of support posts 70, on which each of the platens 20 and 22 are aligned via mounting holes formed therein. In the preferred embodiment, the platens 20 and 22 are individually mounted on the support posts 70, and posts 70 are used to raise each of the platens 20 and 22 to the position as shown in FIG. 4. This position of the apparatus 10 facilitates cleaning of all interior surfaces of the apparatus, simplifying use and maintenance. The lower platen 20 also may include a plurality of guide posts 72 which are designed to extend through corresponding holes formed in the upper platen 22. As seen in FIGS. 1–3, the upper platen 22 may then be firmly secured and clamped to the lower platen 20 by means of retaining nuts or the like. When platens 20 and 22 are secured to one another in this fashion, operation of the machine 10 to mold formable materials can be carried out. It should be recognized, although the preferred embodiment of the apparatus 10 as shown in the foregoing figures has a double-head design, to significantly increase capacity over a single-head design, the number of fill heads may be modified for a particular application. Similarly, although two plungers 52 are shown in use with each of the manifolds 44, a different configuration may be used as desired.

Figure 5:
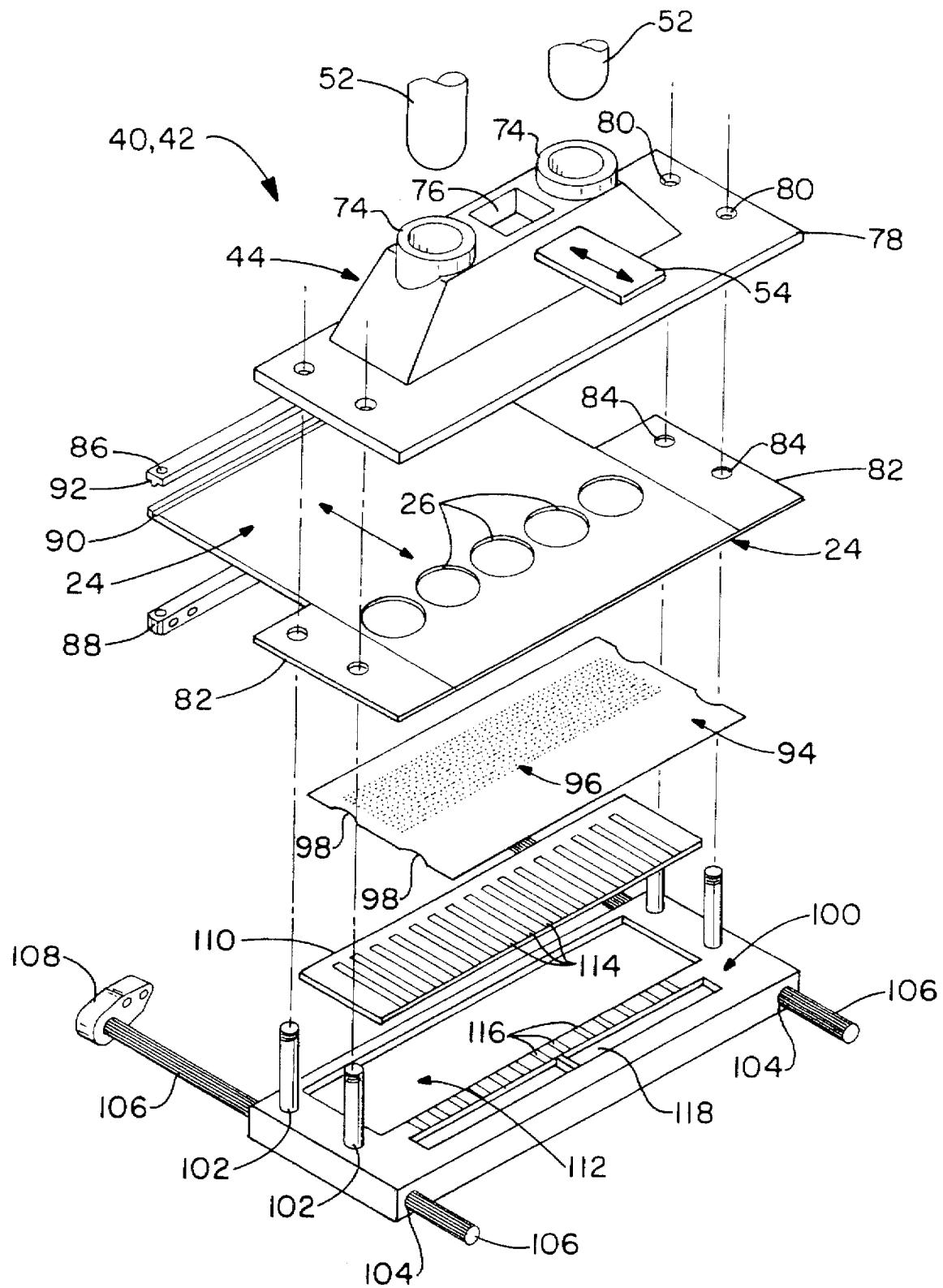
FIG. 5 is a somewhat schematic exploded view of a portion of the molding apparatus shown in FIG. 1.

Operation of the molding apparatus 10 will be understood with reference to FIGS. 5–8, with attention first directed to FIG. 5, which shows further components of each of the first and second platens 20 and 22. In FIG. 5, one of the fill heads 40 or 42 is shown in more detail along with the corresponding components of the first platen 20 cooperating therewith. In FIG. 5, the plungers 52 extend into openings 74 provided in supply manifold 44. The plungers 52 will be reciprocally driven into and out of the supply manifold 44 to selectively apply pressure to a formable material received in the supply manifold 44 through the product infeed opening 76. A product feed gate 54 is selectively moved to seal the product opening 76 so as to isolate the formable material within supply manifold 44. In the preferred embodiment, the supply manifold 44 provides a housing having a predetermined volume for receiving an amount of a formable material through product infeed opening 76. The manifold 44 also includes a mounting portion 78, which is preferably formed to have a structural integrity to generally withstand forces applied to the formable material within the manifold 44 during operation of the machine, to minimize deflection of the mounting portion 78 or other portions of manifold 44. The mounting portion 78 includes alignment holes 80, which allow manifold 44 to be aligned and fixed in position relative to other components of the machine. Because the supply manifold 44 is at a top portion of the machine, the strength of the member may be increased to minimize deflection without affecting critical spacing between other components of the machine. Further, although the supply manifold 44 can be made to minimize deflection, it is not necessary to absolutely prevent deflection of this member as will become apparent as the description proceeds. It should be recognized that on the underside of the supply manifold 44, at least one outlet or discharge opening cooperates with the mold plate 24 and the plurality of mold cavities 26 formed therein. The mold plate 24 in the preferred embodiment, is a relatively thin section plate, which is not designed to withstand the pressures which will be applied thereto during the filling operation. In operation, the mold plate 24 is cyclically and reciprocally moved between fill and discharge or knock-out positions in a direction as shown by the arrow. The mold plate 24 slides between a pair of spacers 82, which in turn are aligned and clamped relative to other portions of the machine by means of alignment holes 84. The mold plate 24 is reciprocally driven by a mold plate drive mechanism, such as that described with reference to FIGS. 1–3, wherein a push bar comprising a clamp bar 86 and a push bar 88 may couple the mold plate 24 to the drive mechanism. In a preferred example, the mold plate 24 includes a keyed edge that is designed to fit within a corresponding slot 92 formed in the clamp bar 86. The push bar 88 may then be secured to the clamp bar 86 to clamp the entire edge of the mold plate 24 therebetween, so as to distribute the load over the extent of the push bar while moving the mold plate 24 via the drive mechanism. Other suitable means of coupling the mold plate 24 to the drive mechanism are contemplated herein.

In the preferred embodiment, disposed immediately below mold plate 24, and formed as part of the lower platen 20 with reference to FIGS. 1–3, is a vent plate 94 having a plurality of vent openings 96 formed over at least a portion thereof. The vent openings 96 are preferably positioned to correspond to the position of the plurality of mold cavities 26 of the mold plate 24 during a fill operation. The vent holes 96 may therefore be formed in any configuration, such as clustered in the region of the mold cavities 26, formed in a pattern corresponding to the perimeter each mold cavity 26 or in another configuration as desired. The vent plate 94 may also include alignment notches 98, which allow plate 94 to be aligned and secured in a desired position relative to the other machine components. The vent plate 94 provides a flush bottom surface against the mold cavities 26, and also separates the mold cavities 26 from other machine components. The vent plate 94, although perhaps desirable for a variety of formable materials, is not a critical component of the forming machine, and suitable venting from the mold cavities may be provided in other manners, such as providing vent channels or the like within the mold plate 24 itself.

The supply manifold 44, mold plate 24 and associated spacers 82 and the vent plate 94, are each aligned with a pressure plate 100, and more particularly to a plurality of upstanding alignments posts 102 as shown in FIG. 5. During operation of the machine, each of these members may be stacked on posts 102 and suitable fasteners used to fix their relative positions. In the stacked configuration, clearance exists for allowing mold plate 24 to move reciprocally between fill and discharge positions relative to the other components. The pressure plate 100 may further include holes 104, which together with push rods 106 form the mold plate drive mechanism in the preferred embodiment. Each push rod 106 forms part of a hydraulic actuator to move rod 106 reciprocally relative to the pressure plate 100. A mounting head 108 is secured to the push bar 88 mounted with the mold plate 24 for driving thereof. A floating clamp plate 110 is disposed within a cavity 112. A seal is formed about the periphery of clamp plate 110 within cavity 112, by suitable means such as an O-ring seal. The clamp plate 110 therefore seals the cavity 112 but can float within cavity 112 while maintaining the sealing relationship within cavity 112. The clamp plate 110 preferably includes a plurality of vent channels 114 formed on its upper side adjacent vent plates 94, to allow the escape of air or moisture during a filling operation. The pressure plate 100 also includes a plurality of corresponding vent channels 116, which cooperate with vent channels 114 formed in the clamp plate 110 to facilitate removal of air or moisture to a vent passage 118 which communicates with vent channels 116.

Figure 8:
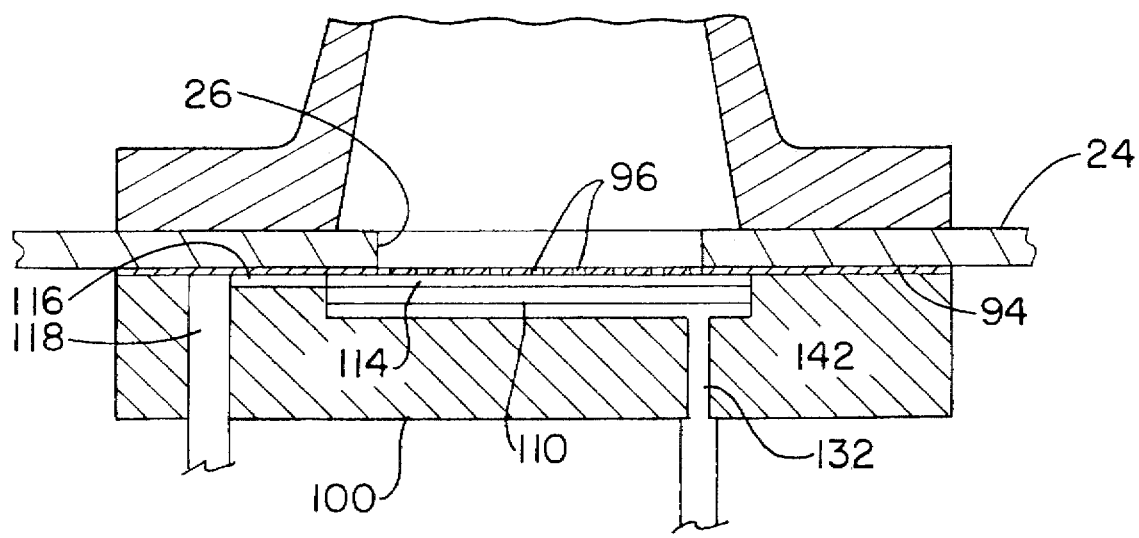
FIG. 8 shows a schematic view of the filling cycle of the molding apparatus, generally showing a cross-section taken along line B—B of FIG. 2.

Operation of the components as shown in FIG. 5 to mold a formable material within mold cavities 26 will be understood more clearly with reference to FIGS. 6–8. The method or process to mold formable materials will also become apparent in association with operation of the machine. In general, it is first mentioned that the construction of the molding machine 10 as well as its operation departs significantly from conventional techniques used in such molding machines. Under conventional thinking, the operation of the molding machine includes applying a continuous pressure on plates or materials to urge the food product into the mold cavities of the mold plate. Because constant pressure was being applied in operation of the machine, the construction of the machine was intended to prevent deflection of the various members in order to rigidly contain the volume of the food product that was to be molded, and thereby control the weight and dimension of the resulting product. In high-speed, large scale food processing systems, preventing deflection of the structural members of the machine requires that the width or thickness of various components be sufficient to withstand the pressures applied. The limitations on width or thickness of the structural members, particularly applied to the mold plate and supporting structures, in turn create a limitation in terms of width of machine and overall capacity of the machine.

In the present invention, departing from the concept of zero deflection, deflection which will occur upon the application of these significant pressures in a filling operation is compensated for by the pressure plate arrangement 100 and floating clamp plate 110 in the present invention. To maintain proper spacing from the mold plate 24 to the conveyor system of the machine 10, the thickness of the pressure plate 100 and corresponding structure is desired to be minimized. The pressure plate 100 and the clamp plate 110 are therefore relatively thin section structural members. The pressure plate 100 includes means to apply pressure on the clamp plate within the cavity 112 of pressure plate 100. As both the pressure plate 100 and clamp plate 110 would not in general have the structural integrity to withstand the pressures applied during a filling operation in the machine, deflection of these members is compensated for by the means to apply pressure to the clamp plate 110, thereby eliminating the need for structural members having the required strength to prevent deflection thereof. The pressure plate 100 may therefore deflect significantly under load, but any deflection will be compensated for by fluid pressure applied to the clamp plate 110. The floating nature of clamp plate 110 allows it to be positively clamped to the underside of the mold plate 24, along with the vent plate 94 if used. Positively clamping the clamp plate 110 against the underside of the mold plate 24 results in retaining the thickness of the mold cavities 26 relative to the discharge opening of the supply manifold 44 to precisely produce products having a uniform weight and dimension regardless of any deflection. The arrangement of the floating clamp plate 110 in association with pressure plate 100 therefore allows the width of the clamp plate to be increased without a corresponding increase in its structural integrity, as deflection of the thin-section members is compensated for by the pressure applying system associated with the pressure plate 100. This in turn enables the width of the mold plate 24 to be significantly increased, allowing much wider forming machines to be produced, which can dramatically increase capacity of such machines. The increased width of the molding machine which is enabled by the present invention also accommodates a double manifold arrangement such as shown in the embodiment of FIGS. 1–3, which can also increase capacity of the machine significantly.

The operation of the pressure plate 100 and clamp plate 110 in association with the mold plate 24 and supply manifold 44 is described with reference to FIGS. 6–8, with FIG. 6 showing the machine in a clamp mode for performing a cavity filling operation. In FIG. 6, the pressure applying means generally designated 120 is preferably a fluid pressure intensifier 122 having a fluid supply line 124 and a fluid output line 126. A piston 128 or other suitable mechanism applies pressure to the fluid introduced by the supply line 124 to an internal cavity 130 so as to be forced under greater pressure out line 126. The piston 128 may be hydraulically driven in the preferred embodiment, but it should be understood that the intensifier 120 can be of a variety of configurations which will force fluid at a desired pressure through the output line 126. Fluid in line 126 may then be diverted to opposed sides of the pressure plate 100, and introduced through access ports 132 to be injected into the cavity 112 and against the underside of the clamp plate 110. As pressurized fluid is introduced into the cavity 112 which is sealed by means of the clamp plate 110, the clamp plate 110 floats upwardly within cavity 112 until it is forced against the mold plate 24, or against a vent plate 94 and mold plate 24 if a vent plate 94 is utilized. In FIG. 6, no vent plate 94 is shown, although it is recognized that for a variety of different formable materials, the vent plate may be used to achieve advantages as will be hereinafter described. Pressurizing of the space beneath clamp plate 110 firmly seals the clamp plate 110 against the bottom of the mold plate 24, and therefore against the bottom of the supply manifold 44. Thus, in the clamp mode shown in FIG. 6, the clamp plate 110, mold plate 24, and manifold 44 are firmly clamped to one another for filling of the mold cavities in the mold plate 24.

As seen in FIG. 6, fluid pressure applied by the pressure applying means 120 onto the bottom of the clamp plate 110 will cause compensating deflection in the pressure plate 100, which maintains clamp plate 110 in firm clamping relation relative to the manifold 44 to maintain the position of the mold plate and therefore of the mold cavities relative to the manifold 44. Thus, even if the manifold 44 were to deflect slightly, the mold plate 24 will conform to it to precisely fill and mold the formable material in the cavities 26. In this arrangement, the clamp plate 110 does not operate in flexure, as a beam would have to, and thereby eliminates the need to provide the clamp plate with a very thick cross-section or mass which would accommodate the forces encountered during a filling operation. The amount of deflection in the pressure plate 100 will depend upon the forces applied during a filling operation, but such deflection is not of significant concern, as the clamp plate 110 at all times firmly clamps the mold plate 24 to manifold 44 to work in the desired manner in conjunction therewith.

Filling of the mold cavities 26 is performed when the clamp plate 110 is pressurized in the manner as shown in FIG. 6. Further aspects of a filling cycle will be described with reference to FIG. 6, wherein it is noted that the supply manifold 44 has been charged with a formable material as shown at 136. After charging of the supply manifold 44 with the formable material, the infeed gate 54 is closed, to isolate the formable material 136 in manifold 44. Closing of the infeed gate 54 also seals off the manifold 44 from the product infeed pressure, and does not allow any material within the manifold 44 to flow back against the product infeed, thereby handling the formable material more gently to avoid damaging it. Simultaneously with or once the product infeed gate 54 is closed, and the pressure plate 100 is activated to pressurize clamp plate 110, the product plungers 52 are actuated to pressurize the formable material 136 within manifold 44 so as to force it into the mold cavities 26. In this process, the formable material is simply pushed from a position directly above the mold cavities 26 into the cavities for filling. As the formable material 136 within manifold 44 is urged full-face into each of the mold cavities 26, without any of the formable material having to be urged through a filling slot or the like, again causing little or no damage to the formable material.

In the filling operation, it should be recognized that as clamp plate 110 is pressurized against mold plate 24, the mold plate 24 is fixed in the clamped position relative to manifold 44 and the mold plate 24 does not move during the filling operation. This also results in less damage to the formable material which may be caused by movement of the mold plate 24 during the filling operation. Additionally, as the product infeed gate 54 is closed and the material within manifold 44 is isolated from the infeed, actuation of the product plungers 52 can impose very high pressures on the material within manifold 44, while not requiring high product infeed pressures. Thus, the pressure applied to feed the material through the feed tube 46 shown in the embodiment of FIG. 1, may be a low pressure, also providing gentler handling of the formable material using apparatus 10. The low pressure feed achievable in the apparatus also allows less costly systems for feeding product to the supply manifolds 44, such as a screw auger system or other low pressure pumping mechanism.

Immediately after filling of the mold cavities as described with reference to FIG. 6, pressure on the intensifier 120 is relieved, such as by withdrawing piston 128 from cavity 130. In this manner, pressurization of the clamp plate 110 is relieved, while simultaneously relieving pressure applied by the product plungers 52. This in turn will result in declamping of clamp plate 110 relative to mold plate 24 to release the mold plate 24 from its locked position relative to the supply manifold 44. At this time, the mold plate 24 is moved from the fill position, as shown in FIG. 6, to a knock-out or discharge position, wherein no cavities are exposed to the formable material in the manifold 44. Substantially simultaneously with depressurization of the clamp plate 110 and of the product plungers 52, the product infeed gate 54 is opened to recharge the supply manifold 44 with additional formable material to replace that just removed in the mold cavities. In the preferred embodiment, depressurization of the intensifier 120 will create a slight negative pressure on the clamp plate 110 to pull it slightly away from the mold plate 24, allowing unrestricted movement of the mold plate to the discharge or knock-out position and allowing low pressure feeding of product to fill the manifold 44 without degradation of the material. At the same time, enough pressure remains on the clamp plate 110 to prevent leakage of material from the manifold due to feed pressure when the infeed gate 54 is opened. Residual pressure on the clamp plate is therefore equal to or slightly greater than feed pressures exerted upon recharging of the manifold 44 so as to retain the formable materials within the manifold. A slight negative pressure on the clamp plate itself applied through the intensifier 120 allows movement of the mold plate 24 immediately after a fill cycle is complete to minimize cycle times. In the preferred operation, the actuator of the intensifier 120 may be tied into the actuators associated with each of the product plungers 52, so that each will be actuated or deactuated simultaneously with one another. In addition in the preferred embodiment, the actuator associated with the product infeed gate 54 may be tied into the actuator for movement of the mold plate 24, such that movement of mold plate 24 to the fill position will cause corresponding closing of the product infeed gate 54 as shown in FIG. 6, and movement of the mold plate 24 to a knock-out position will cause corresponding opening of the infeed gate 54 as shown in FIG. 7. The molding machine of the present invention achieves extremely quick cycle times, providing extremely high-speed movement of the mold plate from the filled and knock-out positions. A complete fill and knock-out cycle can thus be performed extremely quickly, while providing the mold plate in fixed position for filling to provide the advantages mentioned.

Figure 9:
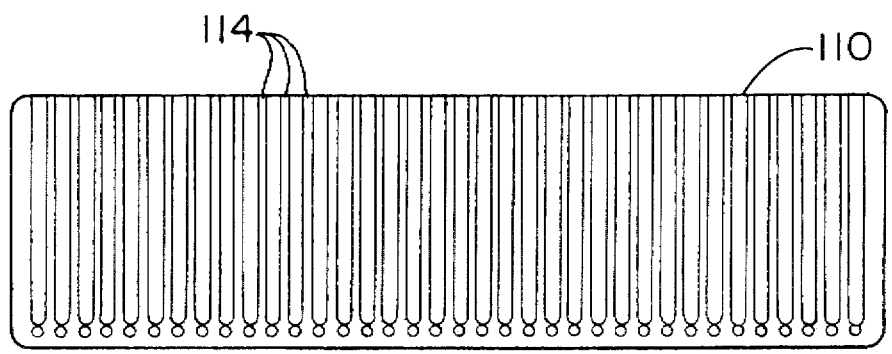
FIG. 9 shows a top view of the clamp plate in the embodiment of FIG. 1.

In another important aspect of the invention, during the fill operation, wherein clamp plate 110 is pressurized against the bottom of the mold plate 24 and against the manifold 44, air trapped in the mold cavities 26 must be vented as the formable material is urged into the mold cavities upon actuation of the product plungers 52. Venting means are therefore provided to allow the escape of trapped air from the mold cavities 26. In the preferred embodiment, the venting means is provided in association with the clamp plate 110. The clamp plate 110, being disposed either directly adjacent to the mold plate 24 or having a vent plate 94 with vent holes 96 disposed therebetween, will expose the top surface of the clamp plate 110 to air escaping from the mold cavities 26 during filling. As shown more distinctly in FIG. 9, the clamp plate 110 may include a plurality of vent channels 114, positioned to receive vented air from the mold cavities to allow its escape. As seen in FIG. 5, the vent channels 114 of the clamp plate 110 communicate with corresponding vent channels 116 formed in pressure plate 100 to allow escape of air to a vent passage 118 which communicates with the external atmosphere. In FIG. 8, the evacuation of air or gasses is shown. As previously indicated, during a filling operation, the clamp plate 110 is pressurized to be clamped against mold plate 24, and any air trapped in the mold cavities 26 will be vented through the vent openings 96 in a vent plate 94 if used, and into a vent channel 114. Gasses received in the vent channel 114 are then urged into a vent channel 116 associated with the pressure plate 100, and to the vent passage 118. The vent passage 118 may be coupled to a suitable catch tank or exhaust as desired. The venting of trapped air from the mold cavities 26 allows pressurization of the clamp plate 110 against the mold plate 124 to be maintained during filling of the cavities as desired. The venting means are therefor very important to properly performing a filling cycle when machine 10 is in the clamp mode.

Figure 10:
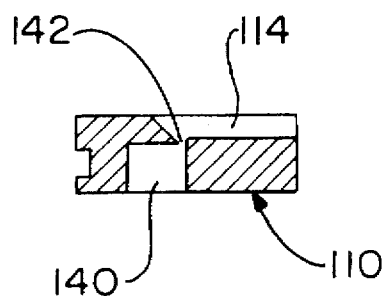
FIG. 10 is a partial cross-sectional view of the clamp plate shown in FIG. 9, showing a vent passage associated therewith.

In the preferred embodiment, there may also be provided a cleaning system for cleaning the vent channels 114, 116, and the vent passage 118. It has been found that with various types of food products, during fill of the mold cavities, air forced out of the cavities through the vent plate 94 and/or vent channels 114 of the clamp plate 110, may contain protein molecules, meat fat molecules or other materials. The protein and meat fat molecules may tend to coat the vent channels 114, for example, and it would be desirable to prevent this coating action. As shown in FIG. 8, and in more detail in FIG. 10, the clamp plate 110 may also be provided with a series of openings 140 formed in the underside of the clamp plate 110, which in a clamp mode will be exposed to the pressurized fluid supplied by the pressure applying means or intensifier 120 in the preferred embodiment. The openings 140 do not extend through the clamp plate 110, but are provided with a very small orifice 142 which communicates with an associated vent channel 114. In the clamp mode, the preferred embodiment uses pressurized water which is injected into pressure plate 100 to pressurize the clamp plate 110 as previously described. The pressurized water is forced into the openings 140 and a small amount is injected through the orifice 142 associated with each of the vent channels 114. In this manner, a small amount of water is injected into each of the vent channels 114 during evacuation of any air trapped in the mold cavities during fill. The injection of water into the vent channels 114 and correspondingly vent channels 116 formed in pressure plate 100 keeps the vent channels and orifices 142 clean by keeping the surfaces thereof wet to prevent coating or clogging by any protein, meat fat, or other entrained molecules in the evacuated air. In the preferred embodiment, the orifices 142 are positioned at an angle to connect with the vent channel 114, such as a 45° angle relative to the vent channel 114, to inject fluid down the channel for wetting of the surfaces. As the orifices 142 are of very small size, only a small amount of water is injected therethrough and no water will contact the formable material during a fill cycle in any way. The provision of jet spray cleaning in this fashion has been found to be particularly important when molding and forming poultry products for example. Although the jet spray cleaning system may be useful for a variety of formable materials, the jet spray cleaning arrangement is optional, and may not be necessary. In addition, as shown in FIG. 5, a number of further jet spray cleaning orifices may be provided in a central divider 144 provided in the vent passage 118, to also maintain the surfaces of passage 118 wet for a similar purpose. Although only a small amount of water would be used in such a system, any excess water would also be vented to an external catch tank or the like as shown in the stream of vented fluids in FIG. 8.

Figure 11:
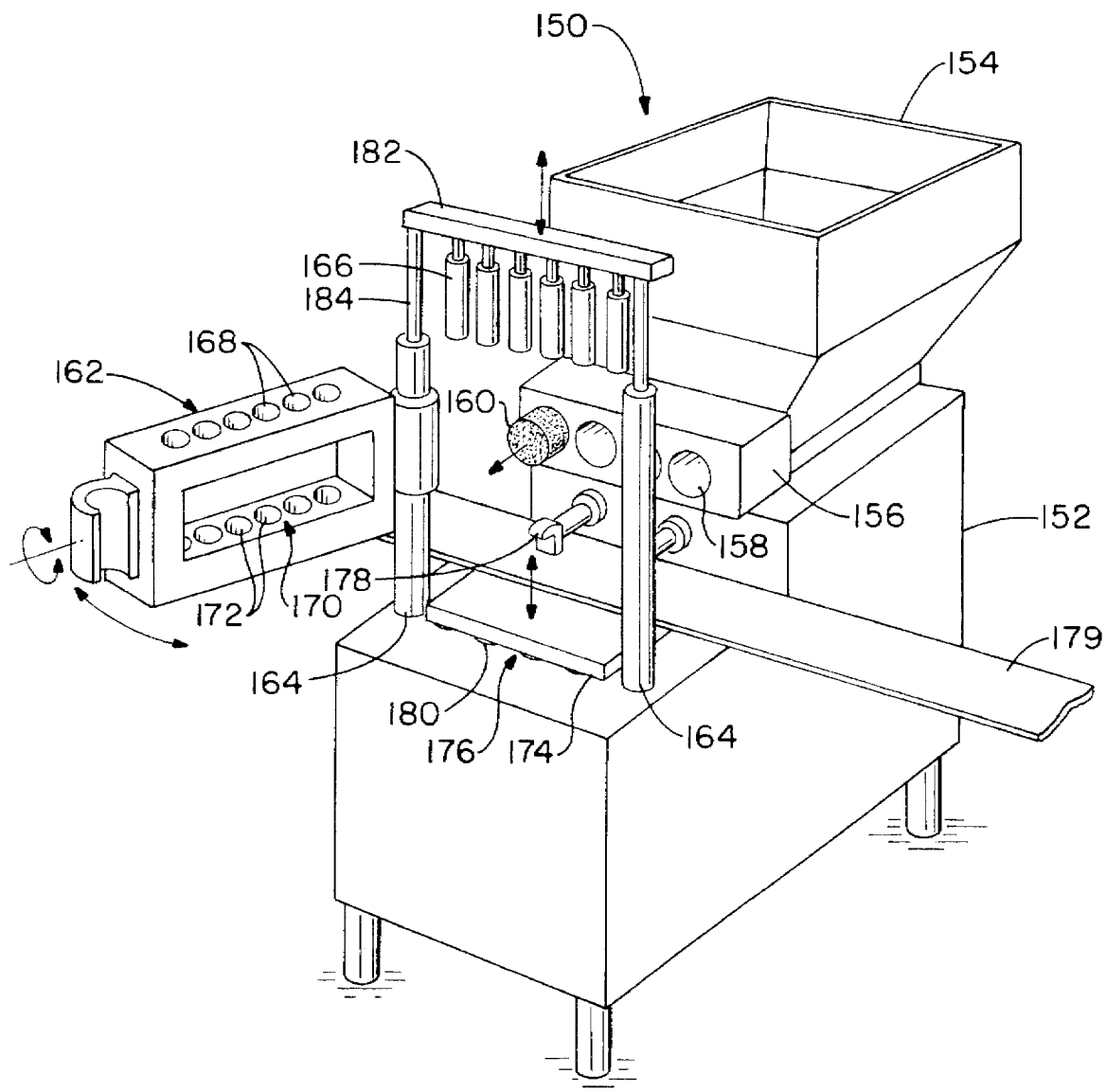
FIG. 11 is a schematic perspective view of an alternative embodiment of a molding apparatus according to the inventions.

Turning to FIG. 11, an alternative embodiment of the forming machine according to the invention is shown. The forming machine 150 has a housing 152 which may be positioned on any suitable surface as shown. Disposed at an upper portion of the housing 152 is a supply hopper 154 into which formable material is positioned for operation of machine 150. Associated with supply hopper 154 is a supply manifold 156 at a lower portion of hopper 154, having a plurality of outlet holes 158. The outlet holes 158 feed formable material from the hopper 154 during a fill cycle by means of a plunger or screw mechanism 160 associated with each of the outlet holes 158. Another suitable means to supply the formable material under pressure from the supply manifold 156 may be used. A pivotable fill manifold 162 is supported on upwardly extending support beams 164. The fill manifold 162 is shown in FIG. 11 in an inspection and cleaning position, being swung out from its operating position on its support via one of the beams 164. As also shown in FIG. 11, the fill manifold 162 can be rotated about an axis 163 to allow the inside of the manifold to be easily accessed for cleaning, wherein the cavity 170 may be positioned to open downwardly in a cleaning position. The fill manifold 162 may be swung into a fill position in association with supply manifold 156 for operation of machine 150. The fill position of manifold 162 provides the holes 168 in a position below a plurality of filling pistons 166. The filling pistons 166 are associated with the support beams 164 and are adapted to reciprocate in the vertical direction relative to the support beams 164. The plurality of filling pistons 166 cooperate with holes 168, such that when in the fill position, the pistons 166 will move through holes 168 and into the cavity 170 in fill manifold 162. Also communicating with the cavity 170 are a plurality of outlet holes 172 positioned at the bottom of cavity 170 in alignment with the fill pistons 166. Situated below the fill manifold 162 in its operative position is a support platen 174 and a mold plate 176 shown in ghost. Although not shown in FIG. 11, the mold plate will include a plurality of mold cavities, and plate 176 is reciprocally driven by a mold plate drive mechanism generally indicated at 178 between fill and knock out positions. A suitable conveyor mechanism 179 may travel through machine 150 adjacent the knock out position of the mold plate 176 to receive the molded food or other product and carry it from machine 150. The support platen 174 is carried by a plurality of actuators 180 which drive the support platen 174 in a vertical direction during fill and knock out cycles of the machine 150.

In general, operation of the machine 150 is as follows. The fill manifold 162 is swung into its operative position relative to the supply manifold 156, and fill pistons 166 are in an upper position similar to that shown in FIG. 11. In this position, formable material from supply hopper 154 is fed into cavity 170 of the fill manifold 162 by the screw mechanism 160 or other suitable means. The support platen 174 is moved upwardly to clamp the mold plate 176 against the underside of fill manifold 162, and the filling pistons 166 are then moved downwardly to apply pressure to the formable material within cavity 170 of fill manifold 162. Formable material from cavity 170 is pressed through the lower openings 172 in manifold 162 toward the mold cavities within mold plate 176, until such cavities are filled. The mold plate 176 is reciprocated between a filling position, in which the support platen 174 presses the mold plate 176 against the lower surface of the manifold 162, and a knock out position, with pressure applied by the platen 174 is reduced and the mold plate 176 moved to a knockout position where the formable material is removed from the filled mold cavities. This operation will be more distinctly seen in FIG. 12, wherein further details of the machine will be described.

Figure 12:
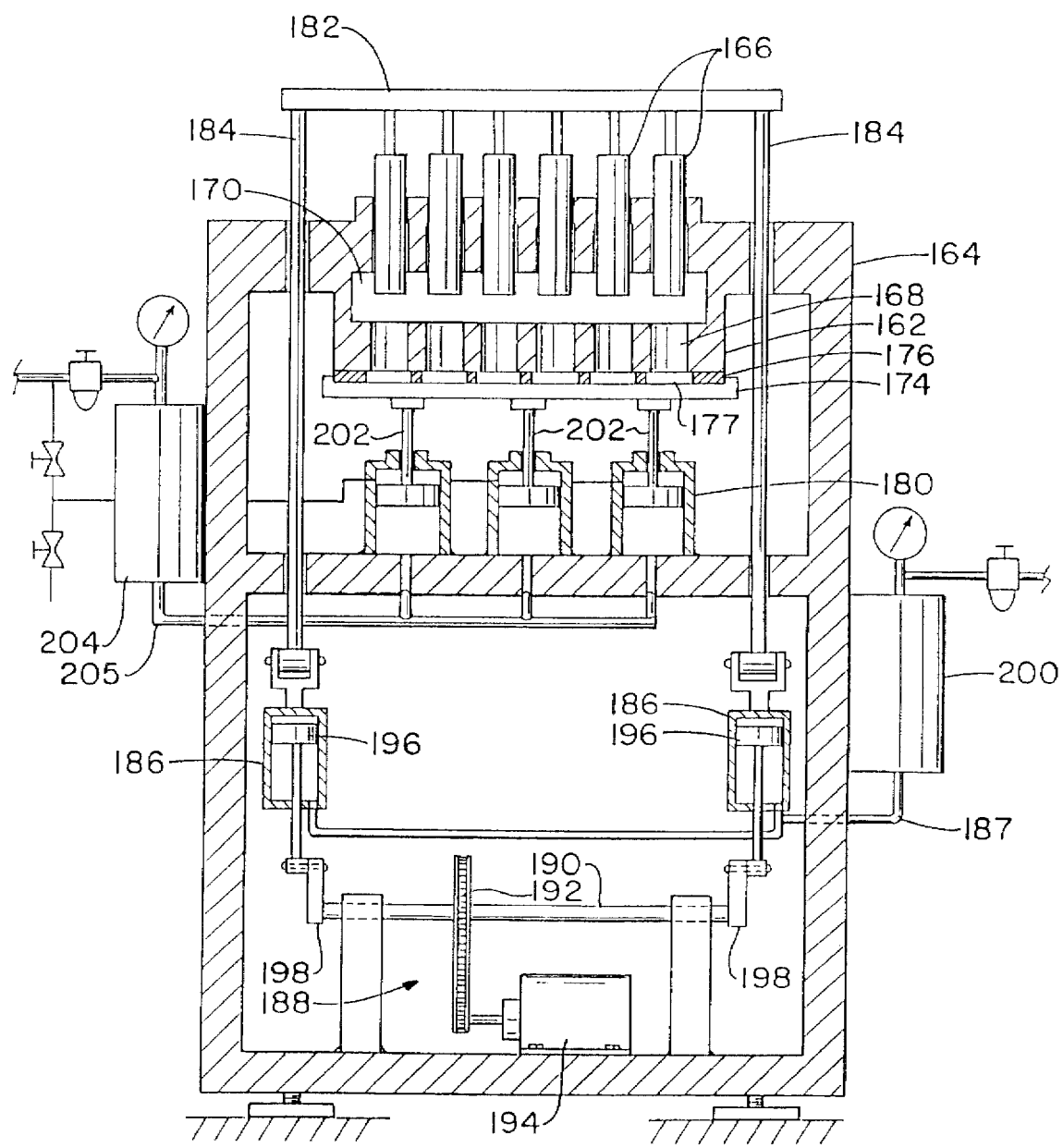
FIG. 12 is a partial sectional view of the molding apparatus as shown in FIG. 11 taken along line 12—12 and illustrating the operational aspects thereof.

In FIG. 12 the plurality of filling pistons 166 are carried on a frame 182 including downwardly extending support rods 184 which are in turn coupled to a pair of frame cylinders 186 forming a part of a crank mechanism generally indicated at 188. The crank mechanism includes a drive shaft 190 carrying a drive sprocket 192 driven by means of a chain drive or the like from a drive motor 194. These pistons 196 associated with each of the frame cylinders 186 include outwardly extending rods which are rotatably attached to coupling members 198 associated with the drive shaft 190 in a position offset from shaft 190. It should be recognized that upon rotation of drive shaft 190, the entire assembly of frame cylinders 186, frame rods 184 and fill piston frame 182 reciprocate along with the filling pistons 166 to force formable material from cavity 170 through the outlet openings 168 and into the mold cavities 177. The two frame cylinders 186 are also supplied with a pressurized fluid such as from a source of compressed air 200. When the pressure in source 200 is constant, the two frame cylinders 186 function as a spring during the last part of a filling stroke of the filling pistons 166 as illustrated in FIG. 12, thereby allowing relatively gentle pressure to be applied to the formable material within cavity 170.

Also during a filling stroke of the machine 150, the support platen 174 is carried by the outwardly extending pistons 202 of a plurality of platen actuators 180, such as three cylinder actuators as shown in FIG. 12. The cylinder actuators 180 may be operated pneumatically from a source of compressed air 204. Upon pressurizing the cylinder actuators 180, the support platen 174 is raised to clamp the platen 174 and mold plate 176 firmly against the lower surface of the manifold 162 as shown in FIG. 12. This again enables the use of the relatively thin support platen 174 in conjunction with the mold plate 176, departing from the concept of zero deflection and instead compensating for deflection of this structure. Deflection of the support platen 174 is compensated for by the means to apply pressure to the support platen, being a plurality of platen actuators 180, thereby eliminating the need for structural members having the required strength to prevent deflection thereof. In this way, the mold plate 176 is rigidly clamped to the support platen 174 and thereby accurately controls the weight and dimension of the resulting product formed within the plurality of mold cavities 177. To allow venting from the mold cavities 177 during a fill cycle, vent passages may be provided on the underside of the mold plate 176 in communication with the mold cavities 177.

Subsequent to a fill cycle as shown in FIG. 12, pressure on the platen actuators 180 is reduced by supplying compressed air to the opposite side of the pistons 202, allowing the mold plate 176 with the mold cavities 177 filled with formable material to be removed to a knock out position by means of the mold plate drive 178 previously described. At the same time, pressure applied by the filling pistons 166 can be relieved by further rotation of drive shaft 190, thereby allowing additional formable material to be introduced into the cavity 170 in the manifold 162. This cycle can then be repeated at high speed for successive filling and removal of formable material to and from the mold cavities 177.

Figure 13:
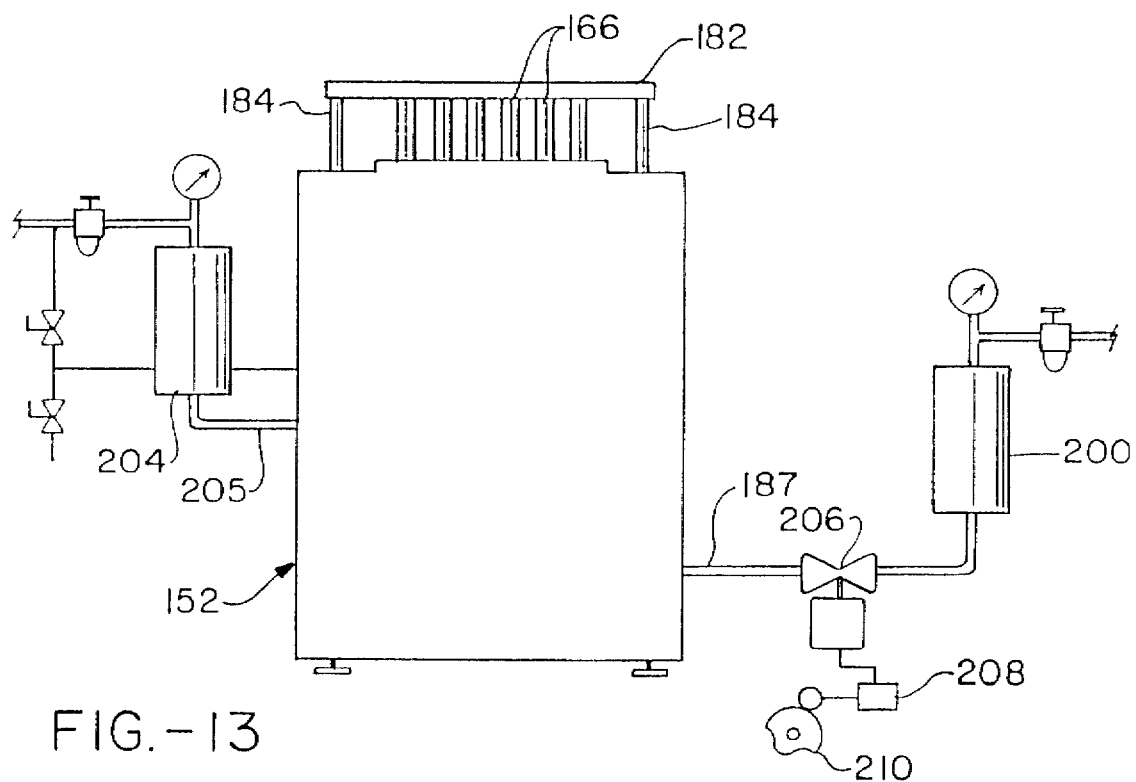
FIG. 13 illustrates an alternative embodiment of the apparatus during a fill cycle.
Figure 14:
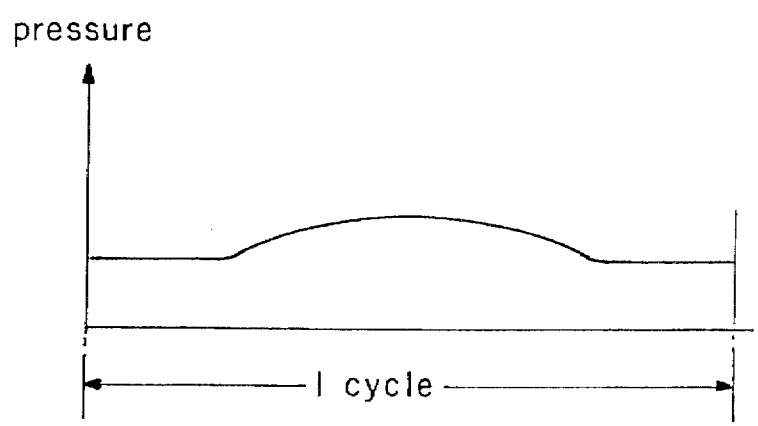
FIG. 14 shows operational parameters of the embodiment as shown in FIG. 13, relating to a particular component thereof.

As a modification to the machine 150 as shown in FIG. 12, the embodiment of FIG. 13 includes a valve 206 associated with the source of compressed air 200. Valve 206 is closed during a later part of a filling cycle or near the end of the down stroke of the filling pistons 166, such that the frame cylinders 186 act like springs having a progressive characteristic. In other words, filling pistons 166 will urge the formable material from cavity 170 into the mold cavities 177 with less resilience during the last part of their down stroke to ensure proper filling of the mold cavities 177. The valve 206 may be suitably opened and closed by means of a suitable control system, such as a electronic control system, or by means of a cam follower 208 in conjunction with a cam disk 210 which is rotated relative to operation of the drive shaft 190. As shown in FIG. 14, the pressure applied by the frame cylinders is seen to have a progressive characteristic during an operation cycle.

Figure 15:
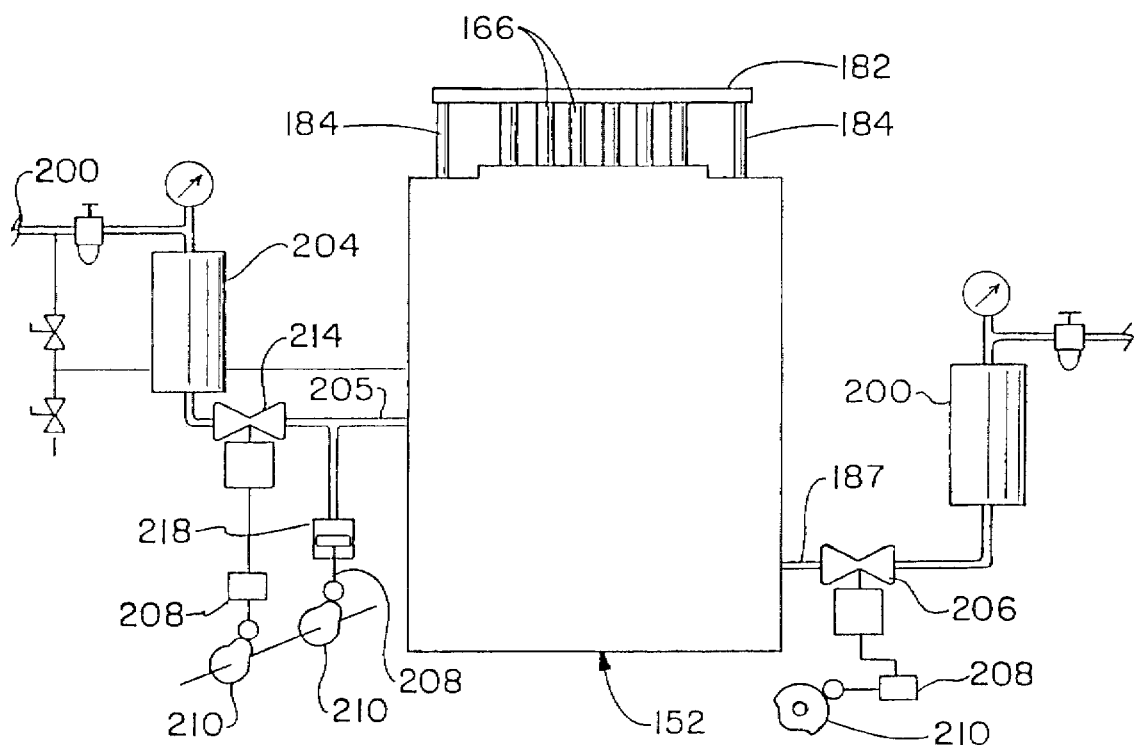
FIG. 15 illustrates another alternative embodiment of the apparatus.
Figure 16:
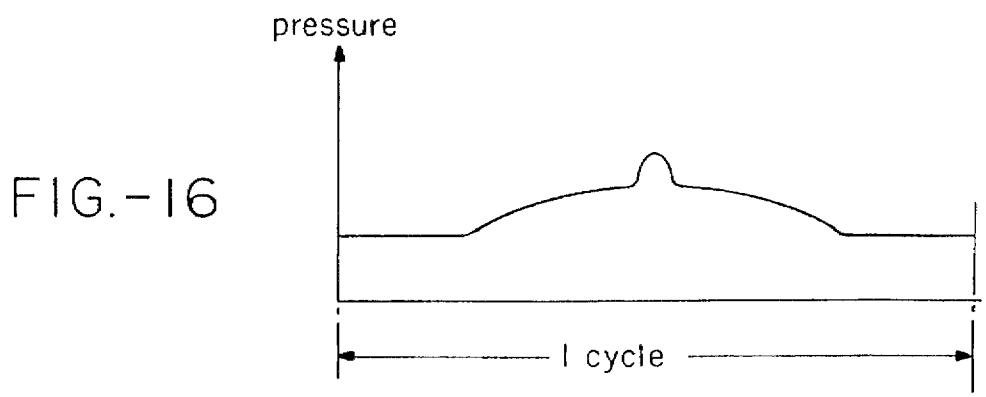
FIGS. 16 and 17 show operation parameters of the embodiment shown in FIG. 15, relating to particular components thereof.
Figure 17:
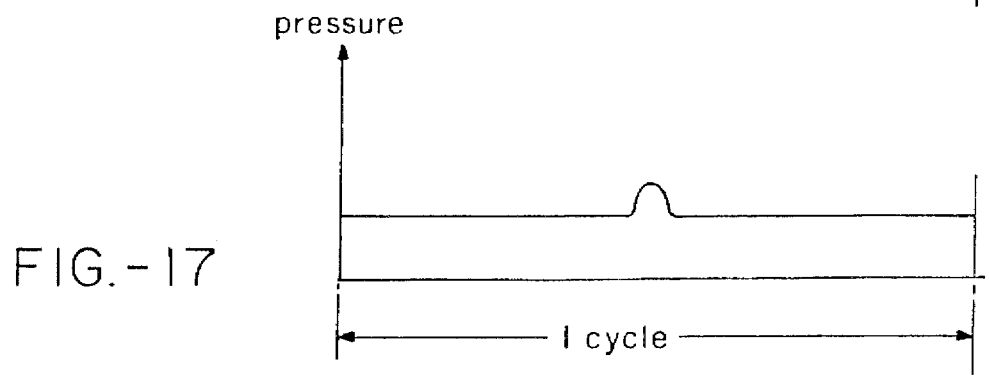

As a further alternative to this embodiment of the invention, the platen or cylinder actuators 180 along with the frame cylinders 186 may be operated hydraulically, with the upper portion of the two sources of pressurized fluid 200 and 204 being filled with compressed air at a predetermined, constant pressure above a hydraulic fluid. In the supply line from each of the tanks 200 and 204, a valve 212 and 214 respectively is followed by a tap line to a pressure increase cylinder 216 and 218 respectively. The pressure increase cylinders 216 and 218 allow the pressure supplied by each of the platen actuators 180 and frame cylinders 186 to be varied in a predetermined and selective manner. In the preferred embodiments, the pressure increase cylinders 216 and 218 are utilized to generate a short pressure increase during the last portion of a fill cycle, resulting in efficient filling of the mold cavities 177. Again, operation of the pressure increase cylinders 216 and 218 and opening closing of the valves 212 and 214 may be performed by a suitable control system, such as by means of cam followers 208 in association with cam disks 210 rotated relative to the drive shaft 190. Other suitable control of these mechanisms are contemplated in the invention. In this embodiment, pressure applied by the platen actuators 180 is shown in FIG. 15, with a pressure spike occurring at the later part of the down stroke of the filling pistons 166. Correspondingly, as shown in FIG. 16, pressure applied by the frame cylinders 186 gradually increases, with a high pressure spike applied by the pressure increase cylinder again at the later part of the down stroke of the filling pistons 166. Other variable pressure actuation of the platen actuators 180 and/or frame cylinders 186 are contemplated in the invention to achieve efficient filling of the mold cavity and operation of the machine as desired.

Based upon the foregoing, it should be recognized that the molding machine of the invention provides a unique arrangement of components to allow relatively thin section members to be used while maintaining a desired relationship between the mold plate and a supply manifold from which formable materials are supplied to the mold cavities. The invention overcomes limitations with respect to the widths with which such members may be made, compensating for deflection of such members. The ability to increase the width of the machine also facilitates the use of double-manifold or other fill arrangements, and also allows for a feed-through conveyor system in association therewith. The arrangement and method of operation also provide gentle handling of the formable materials to maintain their integrity. These and the other advantages and unique characteristics of the molding apparatus and method of forming food materials described with reference to the preferred embodiments provide a high capacity, efficient and versatile system which achieves precise forming of materials with uniform size and weight at higher capacity. The apparatus is versatile enough to be used in line along with other processing equipment, and as a molding machine or as a depositing machine as an example. The apparatus may be used with formable food products or other formable materials as desired. The foregoing description of preferred embodiments of the invention are merely examples, and the invention is not to be limited to the preferred embodiments, as many variations or modifications would be apparent to those skilled in the art based upon the principals of the invention as set forth herein. Such variations or modifications are contemplated within the scope of the invention as set forth in the appended claims.

What is claimed is:

1. A molding apparatus for processing formable materials, comprising:

at least one supply manifold for receiving a formable material therein, a mold plate having opposed first and second surfaces and including at least one mold cavity having a predetermined shape and defining an area between said first and second surfaces, a mold plate drive for driving said mold plate at least between fill and discharge positions, with said first surface disposed adjacent said at least one supply manifold to allow said at least one cavity to be selectively exposed to said formable material in said manifold when in said fill position, at least one plunger for selectively applying pressure on said formable material in said at least one supply manifold to fill said at least one mold cavity when said mold plate is in said fill position, a clamp member positioned adjacent said second surface of said mold plate when in said fill position, and means to apply pressure on said clamp member to clamp said mold plate against said supply manifold, and, a knock-out mechanism to selectively remove formable material from said mold cavity when said mold plate is in said discharge position.

2. The molding apparatus of claim 1, wherein, said clamp member comprises a pressure plate positioned adjacent said second surface of said mold plate, said pressure plate including a floating clamp plate disposed within a cavity formed within said pressure plate, wherein said pressure plate includes means to apply pressure on the clamp plate within said cavity to positively clamp said clamp plate to said second side of said mold plate.

3. The molding apparatus of claim 1, wherein, said clamp member comprises a support platen positioned adjacent said second side of said mold plate, said support platen having pressure applied thereto by means of at least one platen actuator to clamp said support platen to said mold plate, and correspondingly to clamp said mold plate against said supply manifold.

4. The molding apparatus of claim 1, wherein, said clamp member and said means to apply pressure on said clamp member allow the width of the clamp member to be increased without a corresponding increase in the structural integrity of said clamp member, with any deflection of said clamp member being compensated for by said means to apply pressure on said clamp member.

5. The molding apparatus of claim 1, further comprising, a venting system in association with said mold plate to allow venting from said at least one mold cavity during filling of said at least one mold cavity with said formable material.

6. The molding apparatus of claim 1, wherein, said at least one supply manifold includes a gate selectively positioned to stop the flow of formable material into said supply manifold, and to seal the formable material within said supply manifold.

7. The molding apparatus of claim 1, wherein, at least two supply manifolds for receiving a formable material therein are provided, each of said supply manifolds including plunger means for selectively applying pressure on said formable material in said manifold and used to successively fill said at least one mold cavity of said mold plate.

8. The molding apparatus of claim 2, wherein, said pressure plate is supplied with a pressurized fluid acting on said clamp plate to force said clamp plate against said mold plate during a filling cycle.

9. The molding apparatus of claim 8, wherein, said pressurized fluid is water injected into said cavity of said pressure plate between said cavity and said clamp plate to exert substantially uniform pressure on said clamp plate over its width.

10. The molding apparatus of claim 3, wherein, a plurality of platen actuators are used to apply pressure to said support platen substantially uniformly so as to maintain clamping of said support platen to said mold plate.

11. The molding apparatus of claim 10, wherein, said plurality of platen actuators are cylinder actuators having outwardly extending pistons applying pressure to said support platen over its width, with said cylinder actuators supplied with a pressurized fluid acting on said pistons therein.

12. The molding apparatus as in claim 11, wherein, said pressurized fluid is supplied from a source, and includes a pressure increase cylinder for selectively varying pressure applied by said pistons on said two said support platen.

13. The molding apparatus of claim 1, wherein, said plunger means comprises a plurality of filling pistons supported on a frame, and including means to move said frame reciprocally relative to said manifold, said means to move said frame including a pair of frame cylinders supporting said frame, with each of said frame cylinders being supplied with a pressurized fluid, and functioning as a spring during a filling cycle of said machine.

14. The molding apparatus of claim 7, wherein, said mold plate includes at least two spaced apart mold cavities, with each of said at least two mold cavities associated with one of said supply manifolds to be successively filled with said formable material in conjunction therewith.

15. A method of molding formable materials comprising the steps of:

supplying a formable material into at least one supply manifold of a molding apparatus, providing a mold plate having at least one mold cavity, said mold plate being selectively positioned so the at least one mold cavity is exposed to the formable material within said supply manifold, positioning a clamp member adjacent said mold plate, and applying pressure on said clamp member to substantially prevent deflection of said mold plate from a clamped position relative to said supply manifold;

applying pressure on said formable material in said manifold to fill said at least one mold cavity exposed thereto, relieving pressure applied on said clamp member to unclamp said mold plate from said supply manifold, and removing said formable material from said at least one mold cavity.

16. The method of molding formable materials as in claim 15, wherein, said step of supplying a formable material into said at least one supply manifold includes selectively closing said supply manifold to said supply of formable material.

17. The method of molding formable materials as in claim 15, wherein, said mold plate is moved reciprocally from a fill position to a knock out position, wherein said at least one mold cavity is exposed to said formable material within said supply manifold in said fill position, and said step of removing said formable material from said at least one mold cavity is performed at said knock out position.

18. The method of molding formable materials as in claim 15, wherein, said step of applying pressure on said clamp member includes providing a movable clamp plate within a cavity of a pressure plate, and supplying pressurized fluid to said pressure plate to force said clamp plate against said mold plate to substantially prevent deflection of said mold plate.

19. The method of molding formable materials as in claim 15, wherein, said step of applying pressure on said clamp plate includes providing a plurality of cylinder actuators to apply pressure to said clamp plate to force said clamp plate against said mold plate and to substantially prevent deflection of said mold plate.

20. The method of molding formable materials as in claim 15, wherein, said step of applying pressure on said formable material in said manifold includes reciprocally moving plunger means into and out of said manifold.

21. The method of molding formable materials as in claim 15, wherein, said step of applying pressure on said clamp plate to substantially prevent deflection of said mold plate includes compensating from deflection of said clamp plate by allowing deflection of means to apply pressure on said clamp plate.

22. The method of molding formable materials as in claim 15, further comprising the steps of:

isolating said formable material within said at least one supply manifold subsequent to filling of said at least one mold cavity and moving said mold plate from a fill position wherein said at least one said mold cavity is exposed to said at least one supply manifold to remove said formable material from said at least one mold cavity.

23. The molding apparatus of claim 1, wherein, said means to apply pressure on said clamp member acts to force said clamp member against said mold plate when said mold plate is in said fill position, and relieves pressure on said clamp member subsequent to filling of said at least one mold cavity, wherein said mold plate drive then acts to drive said mold plate to said discharge position.

24. The molding apparatus of claim 1, wherein, means to maintain said formable material within said at least one supply manifold are provided in conjunction with said at least one supply manifold to isolate said formable material within said at least one supply manifold during movement of said mold plate between said fill and discharge positions.

25. A molding apparatus for processing formable materials, comprising:

at least one supply manifold for receiving a formable material therein, a mold plate having opposed first and second surfaces and including at least one mold cavity having a predetermined shape and defining an area between said first and second surfaces, wherein said first surface is disposed adjacent said at least one supply manifold to allow said at least one cavity to be selectively exposed to said formable material in said manifold, at least one plunger associated with said at least one supply manifold for selectively applying pressure on said formable material in said manifold to fill said at least one mold cavity when said cavity is exposed to said formable material in said manifold, a clamp member positioned adjacent said second surface of said mold plate, and a force applying mechanism to apply force on said clamp member to clamp said mold plate against said supply manifold, wherein said force applying mechanism applies pressure on said clamp member to maintain said clamp member against said supply manifold in opposition to pressure applied to said formable material within said at least one manifold by said at least one plunger.

26. The molding apparatus of claim 25, wherein, said clamp member comprises a pressure plate assembly positioned adjacent said second surface of said mold plate, said pressure plate assembly including a movable clamp plate and a force applying mechanism to positively clamp said clamp plate to said second surface of said mold plate.

27. The molding apparatus of claim 25, further comprising, a mold plate drive for moving said mold plate at least between fill and discharge positions, and a knock-out mechanism to selectively remove said formable material from said at least one mold cavity, wherein said at least one cavity is exposed to said formable material within said at least one supply manifold in said fill position, and said formable material is removed from said at least one cavity by means of said knock-out mechanism when said mold plate is moved to said discharge position.

28. The molding apparatus of claim 27, wherein, means to maintain said formable material within said at least one supply manifold are provided in conjunction with said at least one supply manifold to isolate said formable material within said at least one supply manifold during movement of said mold plate between said fill and discharge positions.

* * * * *